United States Patent [19]

Siefer et al.

[11] Patent Number: 4,943,689
[45] Date of Patent: Jul. 24, 1990

[54] BACKLIT DIGITIZER TABLET

[75] Inventors: David A. Siefer, Orange; Alexander M. Purcell, Guilford, both of Conn.

[73] Assignee: Summagraphics Corporation, Seymour, Conn.

[21] Appl. No.: 370,913

[22] Filed: Jun. 23, 1989

[51] Int. Cl.⁵ .................. G08C 21/00; G09F 13/04
[52] U.S. Cl. ................................. 178/18; 178/19; 362/33; 362/97
[58] Field of Search ............... 178/18, 19, 20; 362/33, 362/97

[56] References Cited

U.S. PATENT DOCUMENTS 4,206,314  8/1978  Prugh et al. .
4,654,762  3/1987  Laverick ........................ 362/33

Primary Examiner—Stafford D. Schreyer
Attorney, Agent, or Firm—Rosen, Dainow & Jacobs

[57] ABSTRACT

A backlit digitizer tablet providing uniform illumination of the working surface, comprising biaxial fluorescent lamps supplying wide-area light emission under a sandwich top construction including an apertured shield electrode, a first clear spacer, an electrode array, a second clear spacer, and a translucent top, with optically transparent support means for the top.

15 Claims, 3 Drawing Sheets

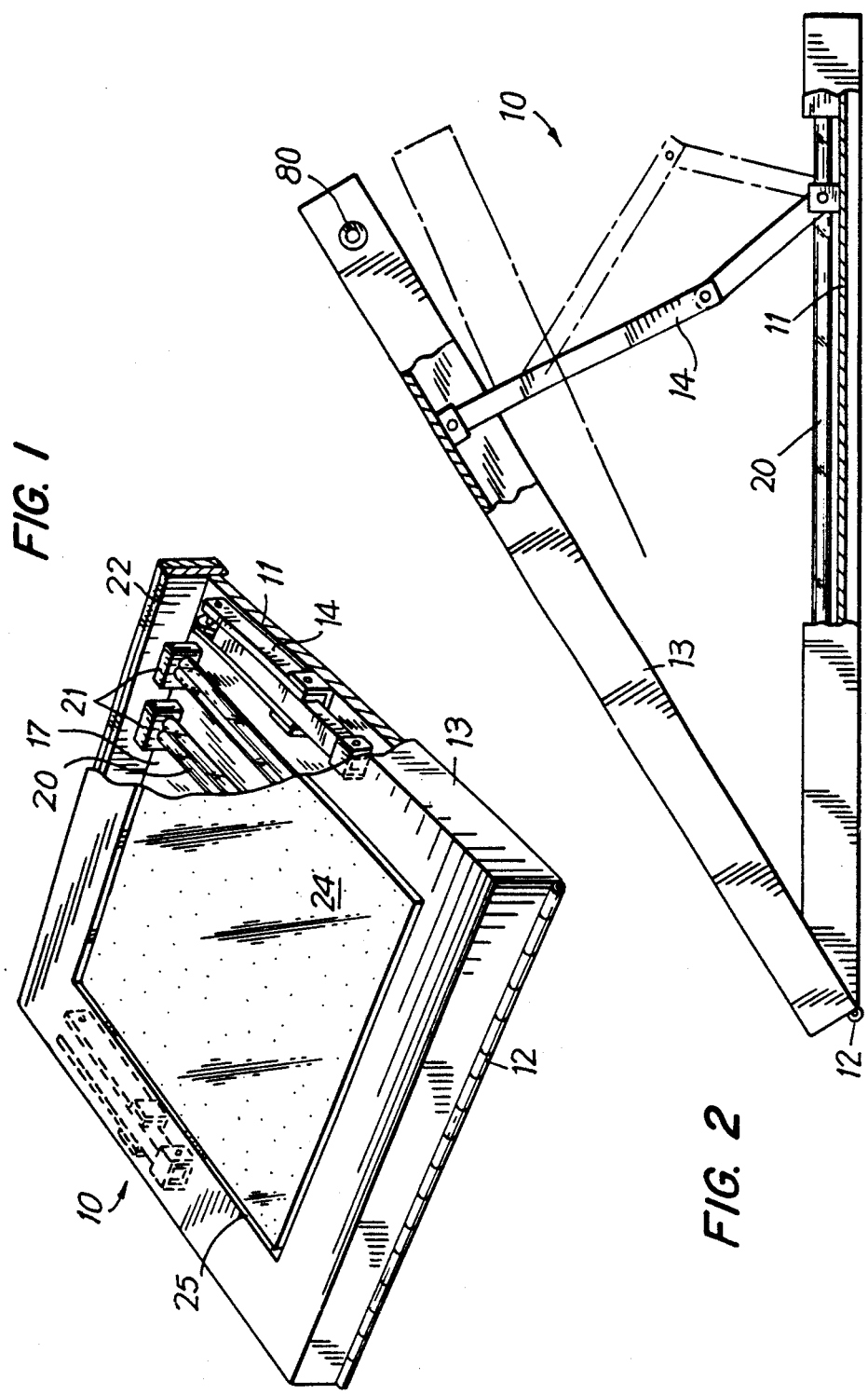

BACKLIT DIGITIZER TABLET

This invention relates to digitizer tablets, and in particular, to tablets of the type requiring illumination of the working surface of the tablet.

BACKGROUND OF THE INVENTION

Digitizer tablets are well known in the art. See for example the review in the January 1989 issue of BYTE magazine, pages 162-174. In certain applications, backlighting of the working surface is highly desirable. Such applications include accurate tracing of drawings, or in CAD/CAM uses. Moreover, such applications often require the use of a larger size tablet, for example, with a 36×48 inch working surface. To accomplish backlighting, it is known to mount fluorescent lamps under the working surface. This creates certain problems, because the working surface is the top surface of a sandwich structure which typically includes the electrode array and an apertured shielding electrode below the electrode array. Parts of these elements are typically light opaque and, being interposed between the light source and the working surface, cause observable grid patterns on the working surface. These patterns, unconnected with the drawings being processed, can interfere with the user's task and are thus undesirable.

In addition, because of the large dimensions of the tablet top and its weight, support members are necessary between the tablet top and the base in the space occupied by the light sources. Moreover, in use, the user leans on the working surface and presses his pointing device on the surface, additional reasons why support for the tablet top must be provided at multiple positions in the light source space. However, the presence of these support members tend to cause dark spots where they contact the tablet top. This also interferes with the proper tablet use.

BRIEF SUMMARY OF INVENTION

An object of the invention is a backlit digitizer tablet providing substantially uniform surface illumination.

Another object of the invention is a backlit digitizer tablet which provides an illuminated working surface that is substantially free of observable lines or dark spots.

A further object of this invention is a backlit digitizer tablet of relatively compact size affording uniform illumination of the surface, yet will conveniently provide access to the lighting sources for maintenance purposes.

The invention is based upon a number of features which contribute separately and in combination to achieving the above-described objects. Several of the more important features are briefly summarized below.

1. Spreading the lighting sources as widely as possible over the space beneath the working tablet surface;
2. Spacing the lighting sources as far as possible from the tablet top. But to stay within reasonable size constraints, using shallow light sources. Preferably biaxial fluorescent lamps are employed, as they are thinner and wider than conventional fluorescent lamps;
3. Constructing the support means for the top of optically transparent material so they will not obstruct the light passage to the working surface. Provide the side surfaces of the support means with texturized surfaces to allow light to enter at the sides and exit via a tapered tip to minimize internal or external reflections;
4. Including in the tablet top optical elements positioned to cause lateral diffusion of the light to prevent imaging of opaque structures beneath.

SUMMARY OF DRAWINGS

These and further features and advantages of the invention will best understood from the following detailed description of a preferred embodiment of the invention, taken in conjunction with the accompanying drawings, wherein:

FIG. 1 is a perspective view of one form of backlit digitizer tablet in accordance with the invention;

FIG. 2 is a side view of the tablet of FIG. 1 showing how the top can be lifted to provide access to the lighting compartment;

DETAILED DESCRIPTION OF PREFERRED EMBODIMENT

Figure 3:
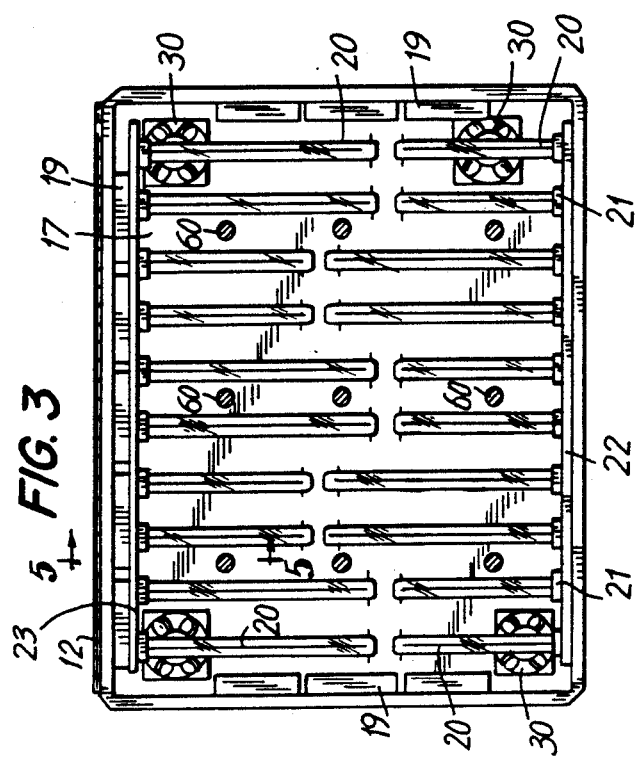
FIG. 3 is a plan view of the of the lighting compartment with the top removed of the FIG. 1 embodiment.

The digitizer tablet of the invention can employ any kind of known technology which would allow the position of a pointing device on or over the tablet surface to be determined and outputted as electrical signals representative of X and Y coordinate information. Technologies currently in use include electromagnetic and electrostatic interaction between an array of electrode wires and a coil in the pointing device. The array underlies the external active area of the tablet surface. In one known arrangement, the array is fabricated by printing the X and Y conductors on opposite sides of a printed circuit board (PCB). It is also well-known to position a shield electrode beneath the electrode array. The shield, which may be electrically conductive or magnetic, functions to minimize interference from undesired fields and to enhance the desired field interaction between the array and the pointing device above the array. In order to backlight such a tablet, it is necessary to provide light sources beneath the shield electrode. To allow light to reach the tablet working surface, it follows that everything between it and the light sources should be transparent. The current state of the art does not allow the construction of shield electrodes and conductor wires of transparent material. Hence, it is known to place apertures in the shield to allow the light through, and to use a transparent PCB to support the electrode array. But this has only been a partial solution, because uneven illumination of the working surface results due to imaging of the electrodes and interference by support members needed in the lighting compartment to support the top. The apparatus of the invention reduces and virtually eliminates these disadvantages in the prior art constructions.

FIG. 1 illustrates a preferred embodiment of a backlit tablet of the invention. The tablet 10 comprises a base member 11 hinged 12 at the rear to a tablet top 13, shown in its closed position. Suitable folding support members 14 are employed to hold the top 13 in its open position, shown in FIG. 2 in solid lines, when access to the interior 17 where the light sources are housed is required. FIG. 2 illustrates in dash-dot lines an intermediate position of the top 13.

FIG. 3 shows the light source compartment 17 with the top removed. The light sources are mounted in suitable holders mounted on the base member 11. In accordance with a feature of the invention, the light sources are biaxial fluorescent lamps 20, available from many suppliers (e.g., GE, Philips Lighting, Osram, GTE), which are characterized by a U-shaped bulb, short overall lengths, and small heights (the height is the vertical dimension of the lamp when mounted in a horizontal position). These lamps also share with other fluorescent lamps wide area light emission, over the whole bulb length, and little heat generation. A typical 40 watt lamp has a length of 22¼ inches, a diameter of 0.70 and width of the U-shape of 1.5 inches, and comes in various color temperatures. Other advantages of biaxial fluorescent lamps are: energy economy, lighting efficiency, various color temperatures, long life (Av. 10,000 Hrs.), and allows use of solid state ballasts and solid state dimmers. As indicated in FIGS. 1 and 3, each lamp 20 is mounted via lampholders 21 horizontally on a bracket mounted along the front 22 and rear 23 walls of the compartment 17. Ballasts 19 for the lamps are mounted directly at the rear, left and right side as shown in FIG. 3. As noted, twenty biaxial fluorescent lamps 20 are provided, ten of them longer and the remaining ten shorter and interspersed throughout the compartment 17 in a regular 2×2 array, with two shorter lamps axially aligned with two longer lamps, followed by two longer lamps axially aligned with two shorter lamps, and so on. This arrangement is preferred because it avoids a linear gap between the lamps which might be visible from the top working surface 24 of the tablet (FIG. 1). The rectangular outline 25 on top is the active area where pointing device locations can be digitized.

Figure 4:
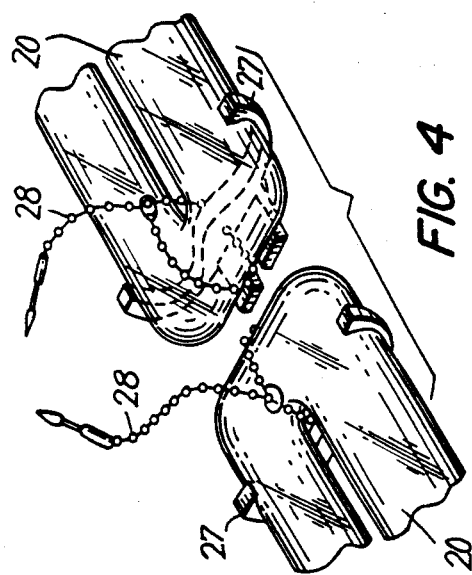
FIG. 4 is a detail view showing mounting of the fluorescent lamps in the lighting compartment of the FIG. 1 embodiment.

The lamp free ends are conveniently supported, as shown in the detail view of FIG. 4, by a U-shaped support piece 27 mounted on the base 11 and connected to a reusable tie wrap 28 which passes through the space at the U-shaped lamp bight and secures the lamp in place. Also shown in FIG. 3 are four small corner-mounted motor driven fans 30. The two fans at the left the two right fans are configured to exhaust air, so a constant flow of cooling air is passed through the lighting compartment for forced air cooling of the lamps and their ballasts.

Figure 5:
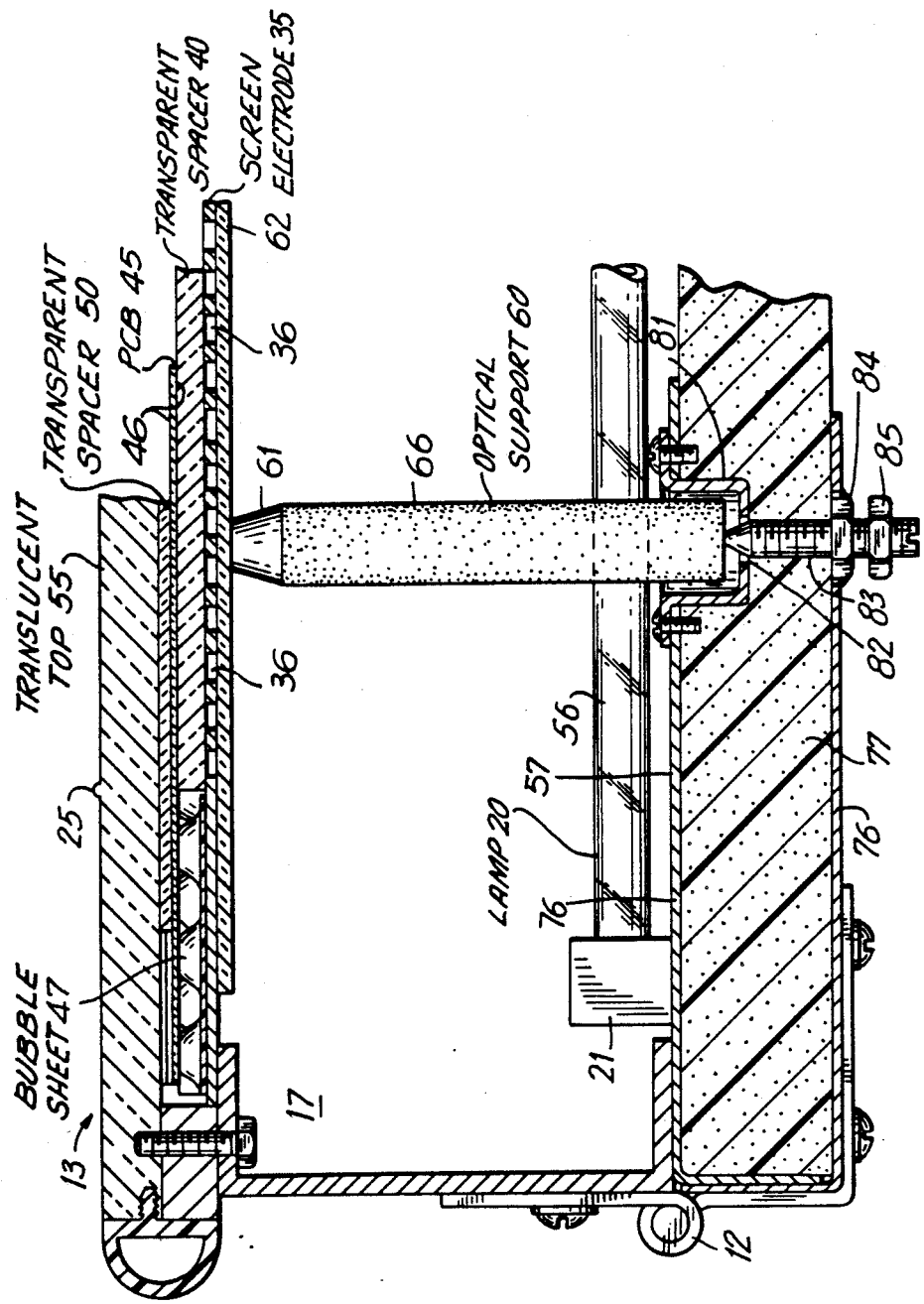
FIG. 5 is a partial cross-sectional view of the tablet of FIG. 1 taken along the line 5—5 of FIG. 3.

FIG. 5 shows a partial cross-sectional view of the tablet rear, to illustrate the sandwich structure of the top 13. In a preferred embodiment, the sandwich structure comprises a screen mesh shield electrode 35, a first transparent spacer 40, a PCB 45 with a printed electrode array on opposite sides, a second transparent spacer 50, and a translucent top member 55.

The shield electrode 35 is preferably constituted of sheet aluminum, thick enough to be rigid. A thickness of 0.05 inch is preferred. This allows a relatively high percentage of holes to be provided to allow light through. Preferably round holes 36, about ¼ inch in size, are provided, distributed uniformly throughout that part of the shield electrode area underlying the active region 25 so that at least 30% of that area is holes. Preferably about 40% holes is employed. The solid portions of the shield are preferably painted white for reflection of light scatter.

The first spacer element 40 is preferably of clear plastic, e.g., acrylic, about 0.2-0.3 inch thick, with 0.22 inch preferred. The PCB 45 is constituted, as is known, of an optically transparent insulating board on the top and bottom sides of which are located the conductors 46. In certain types of tablets, of the travelling wave type in particular, diodes (not shown) are used to isolate each of the conductor lines of the grid. The diodes can be mounted separately along the base or top walls, or mounted at the PCB end extending outside the active area 25 in a recess cut into the end of the first spacer member 40. The first spacer member 40 also functions to electrically separate the PCB wiring from the shield electrode 35.

To reduce the weight of the assembly, a light-weight spacer can be provided between the shield 35 and the PCB 45. As illustrated in FIG. 5, plastic cellular air field bubble sheets 47, which are clear, can be provided outside of the active area 25. It is also possible to replace in whole the clear plastic sheet 40 with a clear bubble sheet 47. This is an advantageous weight-reducing alternative for the clear plastic sheet 40. It also has the advantage of contributing further to diffusing the light coming up from below. Another alternative is described below in connection with FIG. 6.

Mounted above the PCB is the second spacer member 50, also preferably of clear plastic, e.g., acrylic. The top piece 55 is of translucent plastic, e.g., translucent acrylic. It has a thickness of preferably ⅛ minimum to ¼ inch, preferably ⅛ inch. The underlying spacer 50 has a thickness of about 0.07-0.09 inch, preferably 0.08 inch.

To complete the optical description, the lamp top 56 is spaced from the base surface 57 preferably about 20-40% of the spacing from the base surface 57 to the bottom of the shield electrode 35. In a specific example, the lamp surface 56 was about 0.90 inch from surface 57, and about 2.10 inch from the electrode bottom. The overall thickness from working surface 24 to the base bottom was about 4.85 inches.

For large area tablets, interior supports are needed to support the tablet top 13. In accordance with a feature of the invention, the supports are constituted of vertical rod-like members distributed uniformly underneath the table top. In a preferred embodiment, nine such posts 60 are provided, distributed as shown in FIG. 3. Each of the supports is of clear material, e.g., acrylic plastic, circular in cross-section, with a diameter of ⅛-⅜ inch, preferably ¼ inch, and with a tapered top 61, with the area of the rod 60 top contacting an electrode support plate 62 as shown in FIG. 5. Electrode support 62 is made of a clear material, e.g., acrylic plastic, thick enough, e.g., about 0.23 inches, to prevent sagging of the shield electrode 35 between its peripheral anchoring and the center supports 60. This ensures a uniform spacing of the shield electrode 35 from the PCB 45 which avoids digitizing inaccuracies. Only side surfaces 66 of the support rods 60 are textured, embossed or roughened so that light can easily enter the side surfaces. In contrast, the tapered top 61 and the top surface contacting the support 62 are highly polished. The result is that external light easily enters the sides 66 of the rod cylindrical supports 60, and some of it by total reflection gets pumped upward into the tapered portion 61 from which it readily diffuses outwardly and upwardly from the polished portions.

The optical behavior of the tablet and how it manages uniform illumination of the working surface 24 will now be explained. The principles utilized were: emit light over as wide an area as possible and as uniform as possible from below, configure the support posts so that they behave, optically, as if they were not present, and configure the top part to defocus the imaging of any opaque portions in the light path to the tablet surface and to diffuse the light as widely as possible in its path through the top. These principles are applied as follows.

As illustrated in FIGS. 3 and 5, fluorescent lamps were chosen that are wide (double-tube) and shallow, and are distributed over the whole base underlying the active tablet area. Hence, the light is emitted in all directions, from all sides. This minimizes shadows. The lamps are arranged in the long-short arrangement to avoid a dark line. Being shallow, the lamps are spaced a considerable distance from the top 13. This, too, creates a broad area emission and avoids the lamps appearing as line sources.

The support rods 60 act as light transparent members. The textured sides allow light to freely enter the rods and avoid reflections. Ideally, each rod should act, optically, as if it were not present. The textured sides 66 of the cylindrical rod portions 60 and the polished tapered top 61 approach the ideal situation.

It is essential to avoid imaging onto the surface 24 of the solid parts 35 of the shield electrode as well as of the grid conductors 46 on the PCB 45. This is obtained by the combination of the first clear spacer 40, the second clear spacer 50, and the translucent top 55. Experience has shown that this sandwich structure, within the dimensional ranges given, will defocus any imaging of the electrode structure on the top surface so that it is barely, if at all, noticeable at a typical user's distance of about 18 inches. This defocusing, due, we believe, to the only to the relative thickness of the top layer 55, which it will be noted is thicker than the other optical members of the sandwich, but also to the interface between the second clear layer 50 and the top translucent layer 55 which, we believe, tends to scatter light as it crosses the interface. The thickness of the first spacer 40 is mainly determined by the electrical spacing desired between the shield electrode 35 and the grid electrodes 46, and will typically be of a thickness intermediate that of the second spacer 50 and the top layer 55. The shield, as noted, is perforated only under the active area 25, allowing solid shielding along the outside edges to provide cleaner edge signals and also define the surrounding nonilluminated, non-active tablet area.

Figure 6:
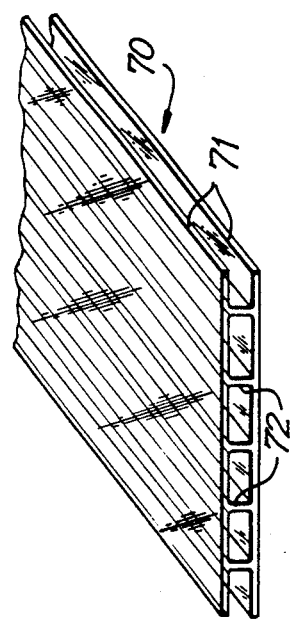
FIG. 6 is a perspective view of an optical spacer construction usable in the embodiment of FIG. 1.

In the illustrative example so far described, the first spaces 40 is a solid clear acrylic sheet. This is a relatively heavy element. FIG. 6 illustrates a twin wall spacer construction 70 that can be substituted for the sheet 40. The spacer 70, made up wholly of a transparent material, e.g., clear acrylic, comprises opposite thin sheets 71 interconnected by vertical ribs 72. This item is available from suppliers in a thickness, for example, of about 0.23 inch, appropriate for the digitizer of the invention. It is preferred to arrange the spacer 70 between the PCB 45 and the shield electrode 35 such that the ribs 72 extend parallel to the front or X-axis of the tablet. The weight of the spacer 70 is much smaller than that of a solid sheet, and it is virtually as strong and as stiff. The rib pattern is not visible on the working surface 24 because, like the shield pattern and PCB pattern, the optical geometry described defocuses any imaging of the rib pattern on the working surface.

It is preferred to provide support rods 60 whose height can be individually vertically adjusted to ensure that the top remains flat without any sagging due to gravity. This is achieved by mounting each rod bottom in a cup-shaped support 81 secured to the base 11 as shown in FIG. 5. A hole 82 at the support bottom allows entry of an adjusting screw 83 whose vertical position can be varied by rotation within a nut 84 fixed to the base. A second nut 85 can be used to lock the screw in position after the adjustment is made.

To further reduce weight, the base 11 can be in the form of sheet aluminum 76 sandwiching a lightweight composite material 77, such as a honeycomb composite or foam sandwich.

Though the biaxial lamps typically have a longer lifetime than ordinary fluorescent lamps, the hinged top allows easy access for lamp maintenance when required. As previously mentioned, solid state ballasting and dimming for light intensity adjustments are advantages associated with biaxial lamps. It is relatively simple therefore to provide a knob dimmer on the tablet so the user can select a desired light intensity. This is shown schematically by a knob 80 in FIG. 2. Also, while for larger tablets the long and short arrangement of biaxial lamps is preferred, for smaller tablets the lamps can be of the same length.

It will be evident from the foregoing description that my invention provides a backlit digitizing tablet that provides uniform illumination of the working surface of a large tablet, and that avoids annoying grid effects, dark spots, or shadows on the working surface. This is accomplished with a tablet construction that still remains relatively thin, compact and light-weight, and that provides ready access to the light sources for maintenance.

While the tablet embodiment disclosed provides uniform illumination of the active area, if desired, the area of illumination could be enlarged to cover, say, one or two extra inches surrounding the active area by appropriate extension of the apertures in the shield electrode. Also, while the sandwich structure of individual pieces is preferred, the combination of members, if desired, can also be laminated to form a single integral structure.

It is understood that the foregoing has shown and described particular embodiments of the invention, and that variations thereof will be obvious to one skilled in the art. Accordingly, the embodiments are to be taken as illustrative rather than limitative, and the true scope of the invention is as set out in the appended claims.

What is claimed is:

1. A backlit digitizer tablet comprising:
   (a) a housing having a base member and a top member mounted on and overlying said base member and defining therewith an intermediate space,
   (b) said top member comprising:
      i. an electrode array for generating electromagnetic or electrostatic fields when energized,
      ii. an apertured shielding electrode extending underneath and spaced from the electrode array for directing the fields upwardly,
      iii. an optically translucent member extending over the electrode array,
   (c) means within the intermediate space for providing additional support for the top member, said means comprising a plurality of spaced, optically transparent posts distributed within the intermediate space and extending between and supporting the top member over the base member,
   (d) means within the intermediate space for generating light that is directed upwardly through the shielding electrode and the electrode array for substantially uniformly illuminating the surface of the translucent member, said means comprising a plurality of fluorescent lamps mounted in spaced relation on the base member and on opposite sides of the posts of the additional support means.

2. A backlit digitizer tablet as claimed in claim 1, wherein the shielding electrode comprises a mesh electrode with the mesh holes less than 50% of the area covered by the electrode.

3. A backlit digitizer tablet as claimed in claim 1, wherein the fluorescent lamps are biaxial lamps whose height is one third or less of the height between the shielding electrode and the base member.

4. A backlit digitizer tablet comprising:
(a) a housing having a base member and a top member overlying said base member and defining therewith an intermediate space, the base and top members having X and Y directions,
(b) said top member comprising:
 i. an electrode array for generating electromagnetic or electrostatic fields when energized,
 ii. an apertured shielding electrode extending underneath and spaced from the electrode array for directing the fields upwardly,
 iii. an optically translucent member extending over the electrode array,
(c) means within the intermediate space for generating light that is directed upwardly through the shielding electrode and the electrode array for substantially uniformly illuminating the surface of the translucent member, said means comprising a plurality of fluorescent lamps mounted in spaced relation side by side on the base member, said fluorescent lamps being biaxial lamps whose height is one third or less of the height between the shielding electrode and the base member, said biaxial lamps all extending in one of the X and Y directions, all of the biaxial lamps being shorter in said one direction than that of said base member whereby plural lamps are fitted on the base substantially aligned with one another in said one direction, some of said biaxial lamps being shorter than others of the lamps, the shorter lamps being interspersed with the longer lamps in said one direction.

5. A backlit digitizer tablet as claimed in 4, wherein the spacing between the shielding electrode and the base member is about 3 inch, and the tops of the lamps are spaced about 0.90 inch from the base member.

6. A backlit digitizer tablet comprising:
(a) a housing having a base member and a top member overlying said base member and defining therewith an intermediate space,
(b) said top member comprising:
 i. an electrode array for generating electromagnetic or electrostatic fields when energized,
 ii. an apertured shielding electrode extending underneath and spaced from the electrode array for directing the fields upwardly,
 iii. an optically translucent member extending over the electrode array,
(c) means within the intermediate space for generating light that is directed upwardly through the shielding electrode and the electrode array for substantially uniformly illuminating the surface of the translucent member, said means comprising a plurality of fluorescent lamps mounted in spaced relation side by side on the base member,
(d) vertical support means extending between the shielding electrode and the base member and assisting in supporting the top member, said vertical support means comprising light transmitting material and having textured side surfaces that will allow light to enter and exit at the top of said vertical support means.

7. A backlit digitizer tablet as claimed in claim 6, wherein the vertical support means comprise a plurality of spaced rod-like members mounted between the lamps, said rod-like members having tops that narrow as they approach the shield electrode.

8. A backlit digitizer tablet comprising:
(a) a housing having a base member and a top member overlying said base member and defining therewith an intermediate space,
(b) said top member comprising:
 i. an electrode array for generating electromagnetic or electrostatic fields when energized,
 ii. an apertured shielding electrode extending underneath and spaced from the electrode array for directing the fields upwardly,
 iii. an optically translucent member extending over the electrode array,
(c) means within the intermediate space for generating light that is directed upwardly through the shielding electrode and the electrode array for substantially uniformly illuminating the surface of the translucent member, said means comprising a plurality of fluorescent lamps mounted in spaced relation side by side on the base member,
(d) said top member comprising in order a clear shielding support, the shielding electrode having holes, a first optically clear spacer member, a light transparent printed circuit board supporting the electrode array, a second optically clear spacer member, and the said optically translucent member, the thicknesses of the first and second spacer members and the translucent member being such that light passing through the holes of the shielding electrode and the space between the electrode array elements spreads laterally defocusing the image of the shielding member and array elements and thereby minimizing dark spots or lines on the top surface of the translucent member.

9. A backlit digitizer tablet as claimed in claim 8, wherein the translucent member is thicker than the first spacer member which in turn is thicker than the second spacer member.

10. A backlit digitizer tablet as claimed in claim 8, wherein the first spacer member is hollow with lengthwise extending ribs.

11. In a backlit digitizer tablet of the type comprising a top surface to be illuminated extending above an electrode system which when energized generates fields for interacting with a pointing device located over the top surface, and provided with a shield electrode extending underneath and spaced from the electrode system for assisting in concentrating the fields at the top surface, and further provided with lighting sources located in a space underneath the shield electrode for generating light, said shield electrode having holes to allow said light to pass through the shield electrode and electrode system and illuminate the surface, said top surface extending over a wide area and thus requiring intermediate vertical support means in the space where the lighting sources are located, the improvement comprising means for uniformly illuminating the top surface and reducing or preventing dark spots or lines at the illuminated top, said means comprising:

said lighting sources including multiple light sources emitting light over a wide area and spaced from the shield electrode, said vertical support means being light transmissive, optically transparent means spacing the shield electrode from the electrode system, an optically translucent member extending over the electrode system, and an optically transparent member contacting the translucent member and between the latter and the electrode system.

12. The digitizer tablet of claim 11, wherein the light sources are biaxial lamps of the same size or of different sizes arranged in a pattern to provide substantially uniform emission of light underneath substantially the entire shield electrode, and the shield electrode comprises a pattern of holes in an optically opaque sheet.

13. The digitizer of claim 12, wherein the translucent member has sufficient thickness to allow the light to spread laterally while passing through it.

14. The digitizer tablet of claim 12, wherein the biaxial lamps each have a thickness less then one-half the height of the vertical support means.

15. The digitizer tablet of claim 12, wherein the optically transparent means comprises clear plastic bubble sheets.

* * * * *

UNITED STATES PATENT AND TRADEMARK OFFICE
CERTIFICATE OF CORRECTION

PATENT NO. : 4,943,689

DATED : July 24, 1990

INVENTOR(S) : David A. Siefer et al.

It is certified that error appears in the above-identified patent and that said Letters Patent is hereby corrected as shown below:

Column 3, line 44, after "at the left" insert --have fan blades arranged to vent air into the compartment 17, and--.

Column 5, line 31, after "to the" insert --lateral spreading of the light, is, we believe, attributable not--.

Signed and Sealed this

Third Day of May, 1994

Attest:

BRUCE LEHMAN

Attesting Officer

Commissioner of Patents and Trademarks